US009013270B2

(12) United States Patent
Naccache et al.

(10) Patent No.: US 9,013,270 B2
(45) Date of Patent: Apr. 21, 2015

(54) ACCESS CONTROL METHOD, CORRESPONDING DEVICE AND COMPUTER PROGRAM PRODUCT

(75) Inventors: David Naccache, Paris (FR); Christophe Dolique, Suresnes (FR)

(73) Assignee: Compagnie Industrielle et Financiere d'Ingenierie "Ingenico", Neuilly-sur-Seine (FR)

( * ) Notice: Subject to any disclaimer, the term of this patent is extended or adjusted under 35 U.S.C. 154(b) by 1417 days.

(21) Appl. No.: 12/370,158

(22) Filed: Feb. 12, 2009

(65) Prior Publication Data

US 2009/0224872 A1 Sep. 10, 2009

(30) Foreign Application Priority Data

Feb. 12, 2008 (FR) ..................................... 08 50884

(51) Int. Cl.

*B60R 25/00* (2013.01)
*G07C 11/00* (2006.01)
*G07C 9/00* (2006.01)

(52) U.S. Cl.

CPC . *G07C 11/00* (2013.01); *G07C 9/00* (2013.01)

(58) Field of Classification Search

USPC ............. 340/932.2, 10.1, 4.6, 4.61, 5.2, 5.21, 340/927, 932.1; 705/5, 6, 13, 19

See application file for complete search history.

(56) References Cited

U.S. PATENT DOCUMENTS 5,535,375 A * 7/1996 Eshel et al. ..................... 703/27
5,585,614 A * 12/1996 VonBallmoos ............... 235/382
6,044,144 A * 3/2000 Becker et al. ............ 379/265.02
6,696,981 B1 * 2/2004 Hashimoto ................... 340/988
6,889,098 B1 * 5/2005 Laval et al. ..................... 700/19
7,312,722 B2 * 12/2007 Tillotson et al. ........... 340/932.2
7,330,131 B2 * 2/2008 Zanotti et al. .............. 340/932.2
7,542,588 B2 * 6/2009 Ekin et al. ..................... 382/103
7,787,965 B2 * 8/2010 Hale et al. ....................... 700/17
7,886,304 B1 * 2/2011 Blaukopf et al. ............. 719/312
7,950,571 B2 * 5/2011 Kubler et al. ................. 235/375
8,041,586 B2 * 10/2011 Jethani et al. ...................... 705/5
2004/0158482 A1 * 8/2004 Hale et al. .......................... 705/5
2004/0172315 A1 * 9/2004 Hale et al. .......................... 705/5

(Continued)

FOREIGN PATENT DOCUMENTS

EP 1420370 A1 5/2004
JP 2002230591 A * 8/2002 ............ G07B 15/00

(Continued)

OTHER PUBLICATIONS

French Search Report of Foreign Counterpart Application No. FR0850884, filed on Feb. 12, 2008.

*Primary Examiner* — Paul Obiniyi
(74) *Attorney, Agent, or Firm* — David D. Brush; Westerman, Champlin & Koehler, P.A.

(57) ABSTRACT

A method is provided for controlling access by a series of users to a space and/or particular service. The method includes the following steps for each of the users: requesting access to the space and/or service by the user, issuing an access authorization or denial; opening of an access to the space or the service, if an access authorization was issued; estimating a waiting period prior to accessing the space and/or service when the opening is delayed; and issuing to the user at least one piece of information representative of the waiting period. The estimation step takes account of a number of users having already passed through the access and still waiting in the space and/or the service.

7 Claims, 4 Drawing Sheets

(56) References Cited

U.S. PATENT DOCUMENTS

| | | | | |
|---|---|---|---|---|
| 2004/0172316 | A1* | 9/2004 | Hale et al. | 705/5 |
| 2004/0181424 | A1* | 9/2004 | Hale et al. | 705/1 |
| 2005/0060173 | A1* | 3/2005 | Hale et al. | 705/1 |
| 2006/0100921 | A1* | 5/2006 | Zanotti et al. | 705/13 |
| 2006/0173733 | A1* | 8/2006 | Fancher | 705/13 |
| 2006/0250277 | A1* | 11/2006 | Colak | 340/932.2 |
| 2006/0250278 | A1* | 11/2006 | Tillotson et al. | 340/932.2 |
| 2007/0050634 | A1* | 3/2007 | Makimoto et al. | 713/182 |
| 2007/0299852 | A1* | 12/2007 | Miyata | 707/10 |
| 2009/0008439 | A1* | 1/2009 | Kubler et al. | 235/375 |
| 2009/0070156 | A1* | 3/2009 | Cleland-Pottie | 705/5 |
| 2009/0109062 | A1* | 4/2009 | An | 340/932.2 |
| 2009/0261988 | A1* | 10/2009 | Ramirez Serrano | 340/932.2 |
| 2010/0085214 | A1* | 4/2010 | Kim | 340/932.2 |
| 2010/0214128 | A1* | 8/2010 | Acharya et al. | 340/932.2 |
| 2011/0213630 | A1* | 9/2011 | Watkins | 705/5 |

FOREIGN PATENT DOCUMENTS

| | | | | |
|---|---|---|---|---|
| JP | 2004157917 | A * | 6/2004 | G08G 1/09 |
| WO | 02/084556 | A1 | 10/2002 | |
| WO | 2005/038688 | A1 | 4/2005 | |
| WO | WO 2006114877 | A1 * | 11/2006 | B66B 1/20 |

* cited by examiner

ACCESS CONTROL METHOD, CORRESPONDING DEVICE AND COMPUTER PROGRAM PRODUCT

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the field of controlling access to a location and/or a service. In particular, the disclosure applies to techniques for controlling access to a private space, e.g., a secure location or a means of transport.

BACKGROUND OF THE DISCLOSURE

Solutions for controlling the access of persons to a private space or a means of transport are already known. These solutions generally use means of verifying the validity of an access right (ticket, memory card).

Thus, for example, the boarding of an aircraft involves the reading of the boarding card delivered to each traveller. However, after this reading, and the corresponding access authorization, the traveller is generally blocked from entering the aircraft, the preceding persons not having been seated. A significant line may then form, resulting in jostling and aggravation, or at the very least irritation among some travellers. It is possible for the hostess or flight attendant controlling access to the aircraft to request their colleague to suspend the access control, but this results in moving the jostling area to the access control level.

There are also means making it possible to temporarily restrict access to a private space, such as a public parking lot or a ski lift, so as to not congest this same space for obvious practical and security reasons. A user wishing to access a private space can, in some cases, therefore be refused access when a critical situation (congestion) inside the space is detected. This may correspond, for example, to the case where no parking place is available in a private parking lot. In the majority of cases, the user will have to wait patiently for an indefinite period of time in front of the access barrier, until a "normal" situation (at least one free parking place) is detected.

Again, these situations cause disturbances jostling, tie-ups, jams . . . ) and aggravation or agitation to the users who are stuck in front of the access barrier.

In other words, these techniques of the prior art lead to congestion upstream from the access control area, causing not only frustration amongst the users, due to the resulting uncontrolled wait, but also security problems.

SUMMARY

An aspect of the disclosure relates to a method of controlling access by a series of users to a space and/or particular service, comprising the following steps for each of said users:

- receiving a request for access to said space and/or service from said user by an access control device, said access control device issuing an access authorization or denial;
- opening an access barrier to said space or said service, if an access authorization was issued;
- estimation by the access control device of a waiting period prior to accessing said space and/or service when said opening is delayed;
- issuing to said user at least one piece of information representative of said waiting period.

According to an aspect of the disclosure, the method is such that said estimation step takes account of a number of users who have already passed through said access barrier and who are still waiting in said space and/or said service.

Thus, an aspect of the disclosure is based on a novel and inventive approach to access control, according to which the user does not immediately access the space or service concerned, but is informed of the time period during which they will have to wait.

The estimation of the waiting period prior to accessing the space and/or service concerned takes account of a number of users who have already passed through the control means and who are still waiting in the space and/or service.

An aspect of the disclosure provides a technique making it possible to limit and control the congestion phenomena not only in front of an access barrier to a private space and/or to a service, but likewise beyond the access area to this same space and/or service.

The knowledge of this time period, which, depending on circumstances, is precise or roughly estimated, leads the users to adopt a rational behaviour and prevents, for example, the jostling due to a gathering or persons in front of an access barrier to a private space.

An aspect of the disclosure thus makes it possible to regulate a flow of persons appearing at a controlled access area, and brings greater comfort and calm to these persons obligated to wait, due to the fact that they are informed of the waiting period.

In an aspect of the disclosure, the method advantageously includes a preliminary step of requesting access which includes a step of reading an access ticket with a ticket reader device, issuing said authorization or denial based on the validity of said access ticket.

This embodiment, for example, is well-suited to a check-in or passport presentation area in an airport.

According to various embodiments, said estimation step can, in particular, take account:

- of at least one piece of information representative of a current context; and/or
- of at least one piece of information read on an access ticket.

In one advantageous embodiment, said issuing step includes a step of displaying said information on a display.

The information can likewise be delivered in any other suitable way, depending on circumstances, and, for example, via speech synthesis.

The method in one aspect of the disclosure includes a step of periodically updating said information representative of said waiting period.

An aspect of the disclosure likewise relates to a device for controlling access by a series of users to a space and/or particular service, which implements the method presented above. In particular, a device such as this includes:

- means for receiving a request for access to said space and/or said service by a user, issuing an access authorization or denial;
- means for opening an access barrier to said space or said service, if an access authorization was issued, and means for delaying said opening, comprising:

means for estimating a waiting period before accessing said space and/or said service when said opening is delayed;

means for delivering to said user at least one piece of information representative of said waiting period.

According to an aspect of the disclosure, the device is such that said estimation means take account of a number of users who have already passed through said access barrier and who are still waiting in said space and/or said service.

According to one advantageous embodiment, said means of receiving an access request include an access ticket reader.

An aspect of the disclosure likewise relates to a computer program product which can be downloaded from a communication network and/or stored on a machine-readable medium and/or is executed by a microprocessor, which is capable of being implemented via the method described above.

BRIEF DESCRIPTION OF THE DRAWINGS

Other characteristics and advantages will become more apparent upon reading the following description of an embodiment, given for purely illustrative and non-limiting purposes, and from the appended drawings, in which.

DETAILED DESCRIPTION OF ILLUSTRATIVE EMBODIMENTS

1. Description of an Embodiment of the Disclosure

The general principle of an aspect of the disclosure is therefore based on an estimate and an indication to a user of a waiting period, in the case where the opening of means of access to a space or a particular service to which they desire access is delayed.

Figure 1A:
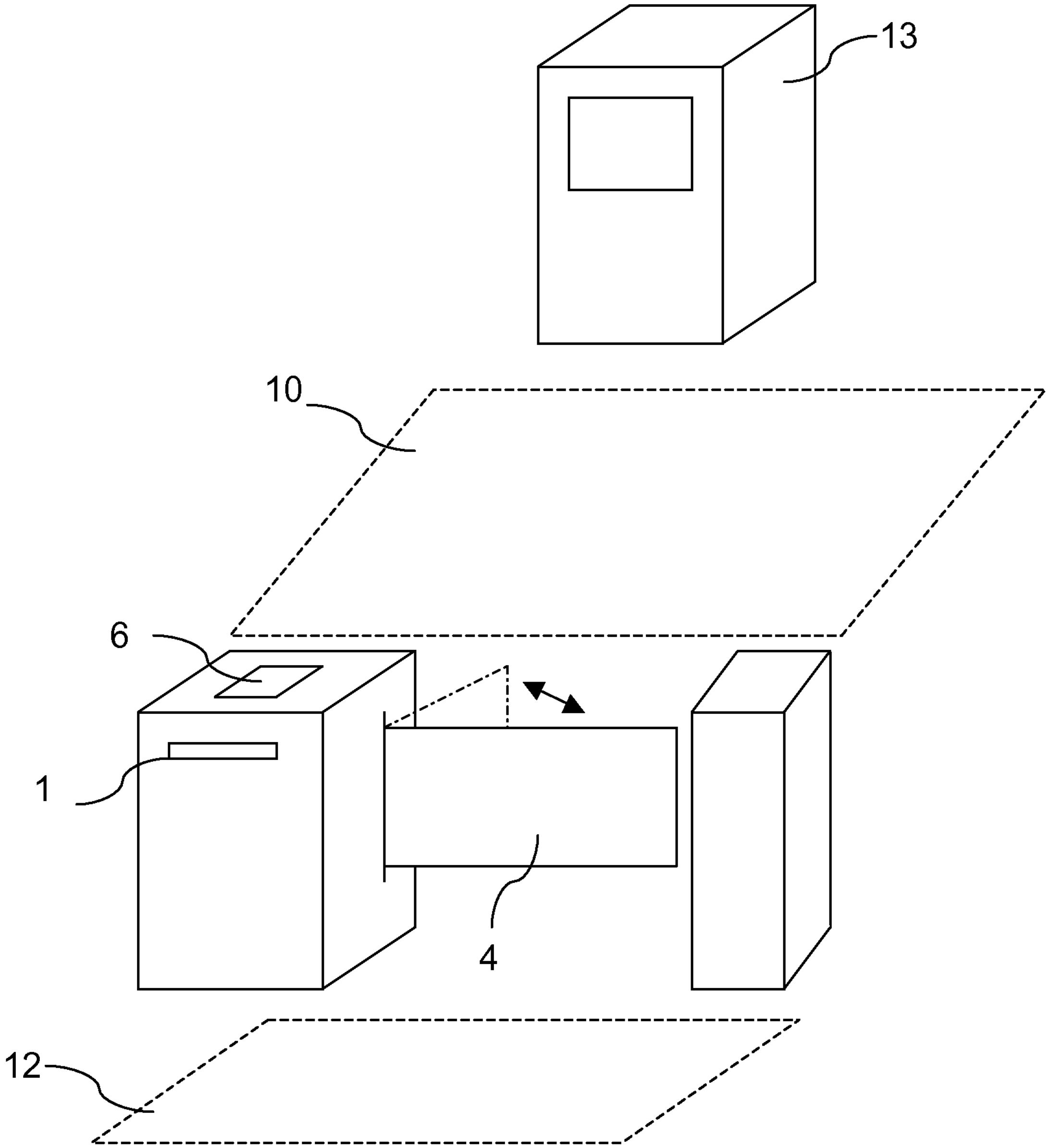
FIG. 1A is a schematic illustration of an exemplary access control device according to a particular embodiment of the disclosure.
Figure 1B:
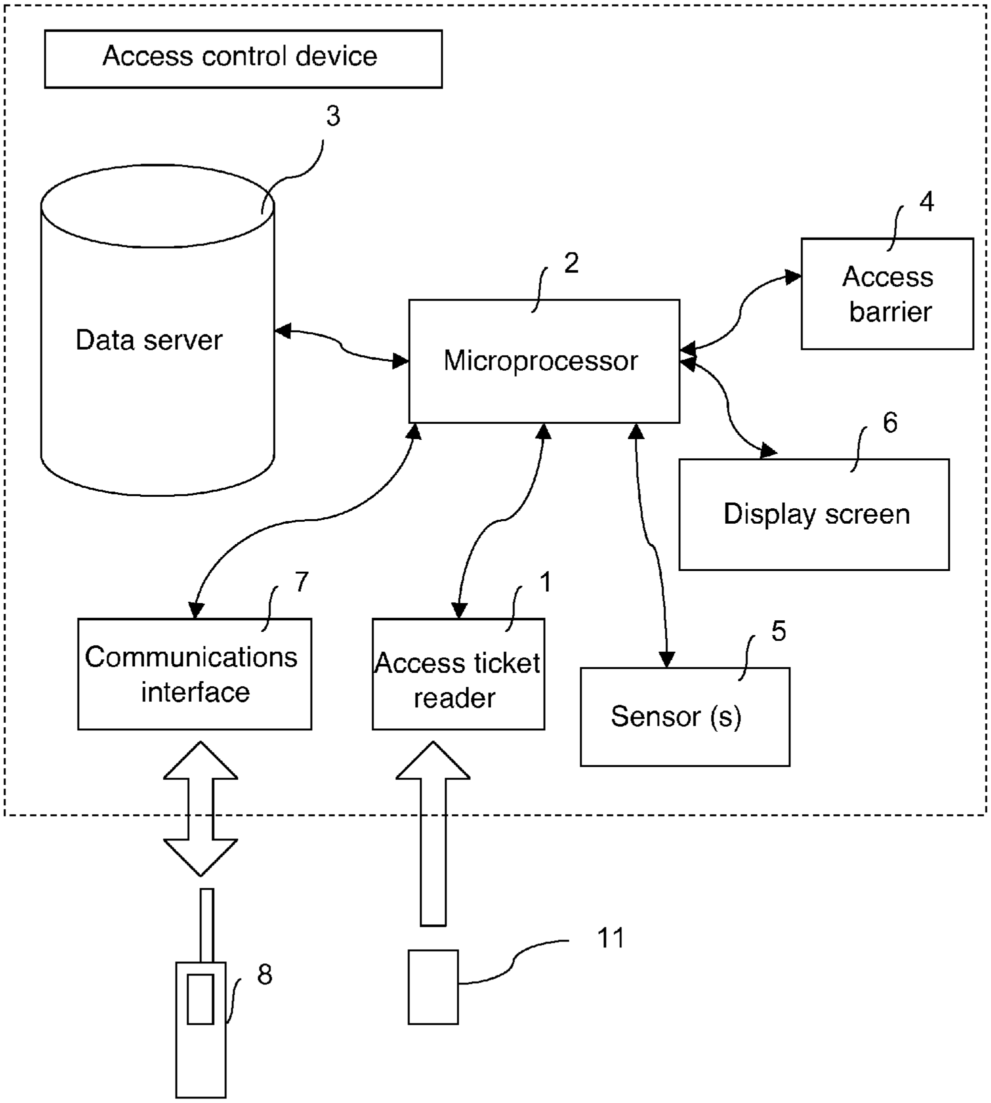
FIG. 1B is a schematic illustration of the components of an access control device according to the particular embodiment of FIG. 1A.

A particular embodiment of the disclosure is presented in relation to FIGS. 1A and 1B in which the access control method is implemented by a device for controlling access to a reserved or secure area, which is situated, for example, inside an airport. A device such as this makes it possible here to control (and regulate) access to a secure space 10, e.g., a space for controlling the passenger passports (who will hereinafter be called "users").

The device for controlling access to the secure space 10 includes means of access which, in this embodiment, consist of an access barrier 4. These may likewise consist of a door, or an indicator light (red or green light, for example).

The access barrier 4 is movable between a closed position (in solid lines in FIG. 1A), prohibiting the access (or entry) of a user towards the secure passport control space 10, and an open position (in broken lines in FIG. 1A), allowing access to the user. As shown in FIG. 1A, the secure passport control space 10 is bounded on one side by the access barrier 4 and on the other side by one or more passport control posts 13 in which the customs personnel can set up.

The access control device includes means of receiving an access request, which include an access ticket reader 1, such as an access ticket 11 which, for example, is a boarding pass (and/or a passport). The access ticket 11 can include a magnetic strip storing transport information (the user's flight number, day of departure, departure time, boarding gate, etc.), and/or personal information (e.g., the user's name).

As shown in FIG. 1B, the access control device includes a central processing unit comprising a microprocessor 2, which is capable of exchanging data with the reader 1 and of issuing an access authorization or denial based on the validity of the access ticket 11. The microprocessor 2 is capable of controlling the operation of the access barrier 4, when an access authorization is issued, via opening means such as an electric motor (not shown).

According to one example, the access control device can delay the opening of the access barrier 4 whereby the user does not immediately access the space or service concerned (even when the user's access ticket is valid). This may be the case, in particular, when a critical situation (congestion or overload) is detected inside the secure space 10. In this case, an aspect of the disclosure makes it possible to inform the user of the time period (exact or roughly estimated, depending on circumstances) during which they will have to wait. This information makes it possible to make the users wait more calmly and to prevent jostling and other aggravations.

The accomplish this, the access control device includes means of estimating a waiting period prior to accessing the secure space, and means of delivering at least one piece of information representative of this waiting period, which are, in the present case, a display screen 6 capable of displaying this information.

The microprocessor 2 can exchange data with a data server 3 (local or remote) in which information representative of a current context is stored. This information representative of a current context is, for example, the flight numbers for which the passengers are admitted into the secure space 10, the times of these flights, the number of customs officials on duty at the customs posts 13, etc. The microprocessor 2 can also receive other information representative of a current context from one or more sensors 5, such as sensors of the number of entries into the secure space 10, and/or the number of exits from the secure space 10 and/or the number of users present in the secure space 10. These sensors, for example, can use at least one optical person-counting device (via camera(s) and/or infrared cell(s)) and/or a mechanical counting device.

The microprocessor 2 of the central processing unit of the access control device is conventionally connected via a data bus to a ROM-type data memory, in which computer program code instructions can be stored, and to a RAM-type data memory. Upon initialization, the computer program code instructions which, in particular, ensure implementation of the method, are, for example, loaded into the RAM memory prior to being executed by the microprocessor 2, which implements the access control method according to the computer program instructions. The means of receiving an access request, the means of opening access means, the means for delaying opening, the means of estimating a waiting period and the means of delivering a piece of information representative of waiting period are controlled by the microprocessor 2.

In an alternative embodiment, the means of receiving an access request can include a push button situated in proximity to the access barrier 4.

It should be noted that the display screen 6 can enable information to be displayed to a user other than the waiting period, e.g., a message informing the user that the access ticket 11 is not valid. The means of delivering at least one piece of information representative of a waiting period can include, alone or in combination, a display screen, a speech synthesis device, a paper receipt printer, etc. The access means can be pivotable, sliding or retractable, and can include one or more flap(s), a carrousel, door, walk-through unit, gate or any other equivalent device known by a person skilled in the art.

Figure 2:
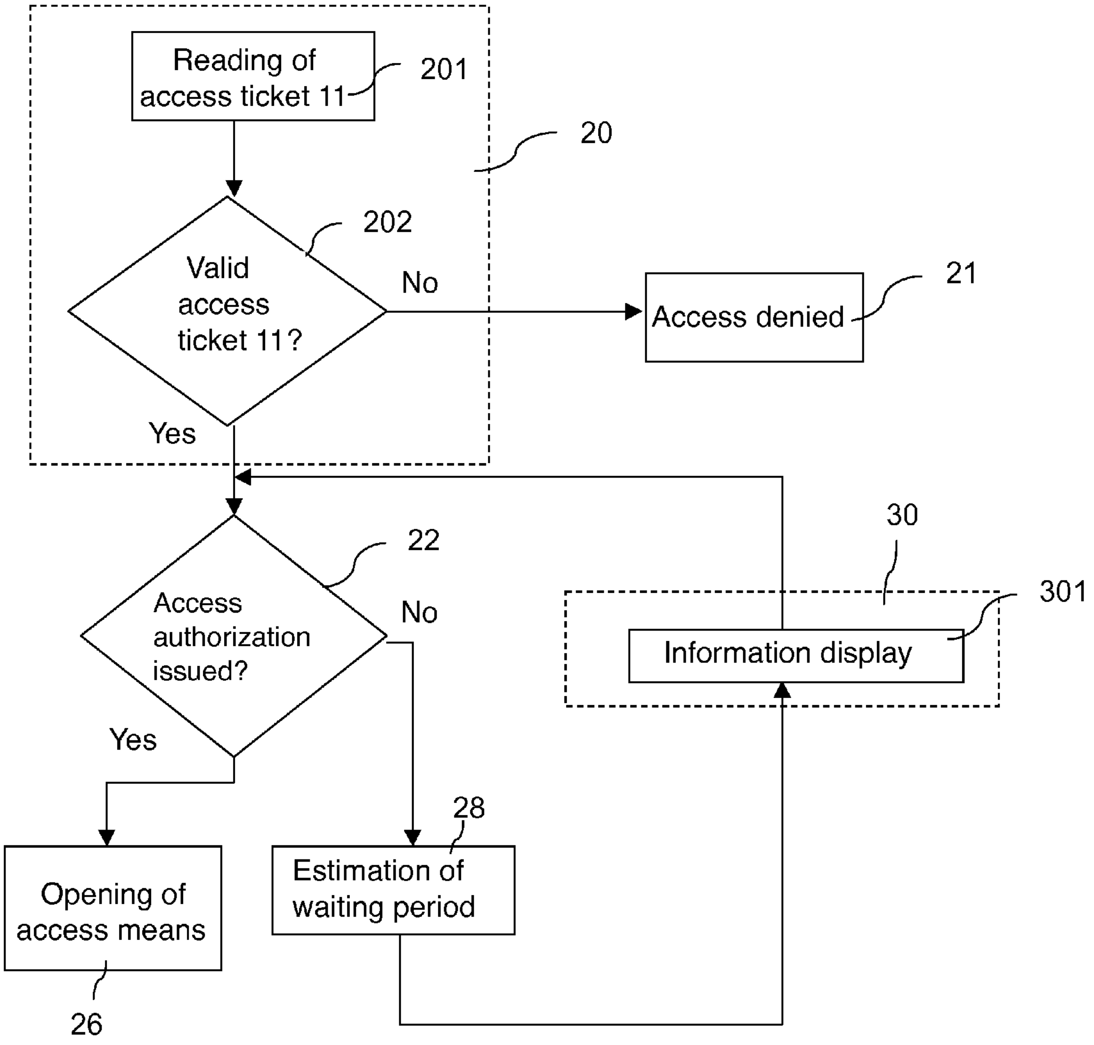
FIG. 2 presents the principal steps of an access control method according to a particular embodiment of the disclosure.

The access control method according to one embodiment is described in relation to FIG. 2.

It is assumed here that a user is located in the area 12 (FIG. 1A) situated upstream from (or in front of) the access barrier 4, and wishes to access the secure space 10 which is situated downstream (or behind) the access barrier 4. Since the access barrier 4 is closed, the user inserts their access ticket 11 into the access ticket reader 1. A first step 20 of requesting access is then implemented. This step 20 includes a step 201 of reading the access ticket 11 and a step 202 of determining the validity of the access ticket 11. Thus, during this step of requesting access, the information stored on the magnetic strip of the access ticket 11 is read by the reader 1 and transmitted to the microprocessor 2, which then determines the validity of the access ticket 11 via exchanges with the data server 3, for example.

In the case where the access ticket 11 is not valid ("no" outcome of step 202), access is denied (step 21) and the access barrier 4 remains closed. A message explaining the denial may possibly be displayed on the display screen 6. In the case where the access ticket 11 is valid ("yes" outcome of step 202), an access authorization can be issued ("yes" outcome of step 22) and the access barrier can be opened (step 26).

However, an aspect of the disclosure makes it possible to delay the opening of the access barrier 4 and to not issue any access authorization even when the access ticket 11 is valid ("no" outcome of step 22). This may be the case, for example, when a critical situation (such as congestion or an overload) is detected inside the secure space 10. In this case, the method includes a step of estimating a waiting period prior to accessing the secure space (step 28), and then a step of delivering to the user at least one piece of information representative of the waiting period (step 30). Step 30 can include, for example, a step 301 of displaying the waiting period. The display can be carried out so that not only the user concerned but likewise those following behind are informed.

At the end of the waiting period, an access authorization is issued and the access barrier 4 can be opened (step 26).

A validation or verification step 22 can be anticipated, in order to verify that the critical situation inside the secure space 10 is no longer detected. This step 22 is advantageously activated periodically, or continuously, and the waiting period is thereby estimated once again (step 28), which enables periodic updating of this time period, so as to increase the reliability thereof.

This waiting period can vary from a few seconds or minutes, in which case the user can wait in front of the access barrier 4, to several tens of minutes or hours, in which case the user can decide to return later and to use this waiting period for another activity.

The knowledge of this time period, which is precise or roughly estimated, depending on circumstances, leads the users to adopt a rational behaviour, and prevents, for example, the jostling due to a gathering of persons in front of an access barrier to a private space.

An aspect of the disclosure thus makes it possible to regulate a flow of persons who appears at a controlled access area, and brings greater comfort and calm to those persons obligated to wait, due to the fact that they are informed of the waiting period.

Figure 3:
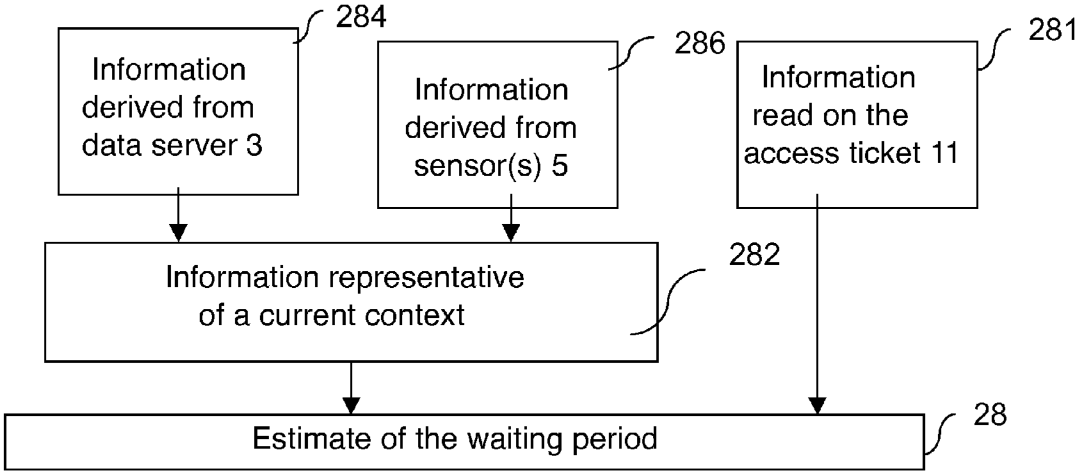
FIG. 3 shows the data taken into account for estimating a waiting period according to a particular embodiment of the disclosure.

The implementation of the waiting time estimation step (step 28 of FIG. 2) according to one embodiment of the disclosure is described in relation to FIG. 3.

In this embodiment, the microprocessor 2 of the access control device estimates the waiting period on the basis of at least one piece of information representative of a current context 282 and/or at least one piece of information 281 read on the access ticket 11.

It is recalled that the information stored in the access ticket 11 can include transport data (the user's flight number, day of departure, departure time, boarding gate, etc.), and/or personal data (e.g., the user's name).

Information representative of a current context can be derived from the data server 3 and include the flight numbers for which the passengers are admitted into the secure space 10, the times of these flights, the number of customs officials on duty at the posts 13, and the maximum capacity of the secure space 10. Information representative of a current context can also or alternatively be derived from the sensor or sensors 5 and can include the number of entries into the secure space 10, the number of exits from the secure space 10, and the number of users present in the secure space 10. If need be, additional information can be supplied by a history database, making it possible to compare a current situation with past situations.

It should be noted that, even there is no congestion in the secure space 10 situated beyond the access barrier 4, it is possible for the access control device to deny opening of the access barrier 4 and to indicate a waiting period to the user via the display screen 6. As a matter of fact, it may be that the user's flight is only two hours away and the message displayed may then be a message of the type "please return in 1 hour".

According to another optional feature, in the case where the access control device of the invention does not issue any access authorization, even if the access ticket is valid, the method can enable the user to make a reservation to access the secure space 10 via the display screen 6 and an input means such as a keyboard or a voice recognition system (not shown in FIGS. 1A and 1B). The user can then be allocated a time table or time slot during which they may reappear at the access barrier 4 and, during this wait, be able to wait in another location of the airport, e.g., in a shopping mall. The time table or time slot is determined by the microprocessor 2, based on the waiting time estimate as described above. Management of the access reservations can be carried out by the microprocessor 2 in cooperation with the data server 3.

According to another optional aspect of the disclosure, after having reserved a time slot, the user can be alerted as to the immediacy of the start of the reserved time slot. In this figurative case, the access control device includes, for example, a communication interface 7 connected to the microprocessor 2, which enables communication with a portable communication device 8 held by the user, and transmission of an alert message (of the SMS-type, for example) requesting, for example, the user to go as quickly as possible to the access barrier 4. The portable communication device 8, for example, can be a mobile telephone, a personal digital assistant (PDA), or any other known communication device.

The present disclosure can be applied to any situation requiring controlled access to a defined area accessible to vehicles and/or to pedestrians. In this way, the technique of the disclosure can be used to control access to an airport, a station, a ski lift or a parking lot.

Numerous other applications can also be anticipated non-limitatively, such as:

access to a lift or footbridge, or to any other system having to take account of a maximum number of persons and/or a weight limit;

access to services provided by humans (ticket windows, cash registers, . . . ) or automated machines (cash or object dispensers, . . . );

access to private spaces;

access to a road (highways in particular) or a bypass area (e.g., bridges, tunnels, borders . . . ), in order to regulate traffic.

The access ticket can be a contact or remotely read smart card (e.g., an RFID card), a ticket including a bar code or possibly be integrated into a portable communication object.

The access control technique can likewise control access to a space based on information stored in the access ticket, information communicated by a portable communication object, biometric identification information, information input by a user (e.g., a password), either alone or in combination.

The estimate of the waiting period can be communicated to the user by display, speech synthesis, printing or electronic messaging means.

An aspect of the disclosure thus provides a technique making it possible to limit and control the congestion phenomena not only beyond an access barrier to a private space and/or to a service, but likewise in front of the access area to this same space and/or service.

An aspect of the disclosure implements such a technique making it possible to regulate the flow of persons appearing at an access control area.

A further aspect provides such a technique which, in situations of congestion in particular, makes it possible to lessen behaviours due to jostling, frustration, irritation and/or aggravation.

Although the present disclosure has been described with reference to one or more examples, workers skilled in the art will recognize that changes may be made in form and detail without departing from the scope of the disclosure and/or the appended claims.

What is claimed is:

1. A method of controlling access by a user to at least one of a space or particular service, comprising the following steps for said user:

receiving a request for access to said space or particular service from said user by an access control device, including a step of reading an access ticket with a ticket reader device, said access control device issuing an access authorization or denial based on validity of said access ticket;

opening an access barrier to said space or said particular service, if an access authorization was issued;

estimation, by the access control device, of a waiting period prior to accessing said space or particular service when said opening is delayed by taking account of at least one piece of information read on said access ticket, which is selected from the group consisting of:

a piece of transport information, which is selected from the group consisting of a flight number, a day of departure, a departure time, a boarding gate;

and personal information of the user, said estimation step taking also account of a number of other users having already passed through said access barrier and still waiting in said space or said particular service;

issuing to said user at least one piece of information representative of said waiting period, and transmitting an alert message to a portable communication device of said user requesting said user to access to said space or particular service when said waiting period is about to end.

2. The method of claim 1, wherein said estimation step takes account of at least one piece of information representative of a current context.

3. The method of claim 1, wherein said issuing step includes a step of displaying said information on a display.

4. The method of claim 1, wherein the method includes a step of periodically updating said information representative of said waiting period.

5. A device for controlling access by a user to at least one of a space or particular service, comprising:

an access ticket reader, which is configured to receive a request for access to said space or said particular service by a user by reading an access ticket and to issue an access authorization or denial based on validity of said access ticket;

means for opening an access barrier to said space or said particular service, if an access authorization was issued;

means for delaying said opening, comprising:

means for estimating a waiting period before accessing said space or said particular service when said opening is delayed by taking account of at least one piece of information read on said access ticket, which is selected from the group consisting of:

a piece of transport information, which is selected from the group consisting of a flight number, a day of departure, a departure time, a boarding gate;

and personal information of the user, said means for estimating a waiting period takes also account of a number of other users having already passed through said access barrier and still waiting in said space or said particular service;

means for delivering to said user at least one piece of information representative of said waiting period, and means for transmitting an alert message to a portable communication device of said user requesting said user to access to said space or particular service when said waiting period is about to end.

6. A non-transitory machine-readable medium comprising instructions stored thereon and executable by a microprocessor, the instructions implementing a method of controlling access by a user to at least one of a space or particular service when executed by the microprocessor, wherein the method comprises the following steps for said user:

receiving a request for access to said space or particular service by said user, including reading an access ticket with a ticket reader device, and issuing an access authorization or denial based on validity of said access ticket;

opening an access barrier to said space or said particular service, if an access authorization was issued;

estimation of a waiting period prior to accessing said space or particular service when said opening is delayed by taking account of at least one piece of information read on said access ticket, which is selected from the group consisting of:

a piece of transport information, which is selected from the group consisting of a flight number, a day of departure, a departure time, a boarding gate;

and personal information of the user, said estimation step taking also account of a number of other users having already passed through said access barrier and still waiting in said space or said particular service;

issuing to said user at least one piece of information representative of said waiting period, through said access barrier and still waiting in said space or said particular service, and transmitting an alert message to a portable communication device of said user requesting said user to access to said space or particular service when said waiting period is about to end.

7. The method of claim 1, wherein the at least one piece of information comprises personal information of the user, which comprises a name of the user.

* * * * *